United States Patent [19]

Hamill et al.

[11] Patent Number: 4,597,256

[45] Date of Patent: Jul. 1, 1986

[54] METHOD AND APPARATUS FOR IMPROVED SHUTDOWN PROCEDURES IN DUAL FLUID CHENG CYCLE ENGINES

[75] Inventors: James Hamill, San Jose; Ramarao Digumarthi; William Conlon, both of Palo Alto; Dah Y. Cheng, Los Altos Hills; Chun-Nan Chang, Los Altos, all of Calif.

[73] Assignee: International Power Technology, Inc., Palo Alto, Calif.

[21] Appl. No.: 723,801

[22] Filed: Apr. 16, 1985

[51] Int. Cl.⁴ ............................................. F02C 7/00
[52] U.S. Cl. .................................. 60/39.05; 60/39.3
[58] Field of Search ................... 60/39.05, 39.13, 39.3, 60/39.53, 39.55

[56] References Cited

U.S. PATENT DOCUMENTS

| | | | |
|---|---|---|---|
| 2,469,678 | 5/1949 | Wyman | 60/39.3 |
| 3,021,673 | 2/1962 | Mock | 60/39.3 |
| 4,160,362 | 7/1979 | Martens et al. | 60/39.3 |
| 4,259,837 | 4/1981 | Russell et al. | 60/39.55 |

*Primary Examiner*—Louis J. Casaregola
*Attorney, Agent, or Firm*—Limbach, Limbach & Sutton

[57] ABSTRACT

An improved shutdown procedure, which minimizes the potential for steam condensation in the superheater section, combustion chamber and turbines during the coast to halt of the engine maintains high temperatures until all the steam has passed through the system.

1 Claim, 1 Drawing Figure

METHOD AND APPARATUS FOR IMPROVED SHUTDOWN PROCEDURES IN DUAL FLUID CHENG CYCLE ENGINES

DESCRIPTION

1. Technical Field

This invention relates generally to improved procedures for shutting down boiler systems, particularly steam injected gas turbine Cheng cycle engines.

2. Background of the Invention

The dual fluid heat engine has been described in U.S. Pat. Nos. 3,978,661, 4,128,994 and 4,248,039. Parameter optimization and control paths for the dual fluid heat engine are described in U.S. Pat. Nos. 4,297,841, 4,417,438 and 4,393,649. This invention relates to improved procedures to be used in the shutdown of dual fluid heat engines utilizing the Cheng cycle.

SHUTDOWN PROCEDURES

In the Cheng cycle system, the boiler section (comprising superheater, evaporator and economizer sections) is connected to the gas turbine via the combustion chamber. One of the most potentially destructive events for the gas turbine is the intrusion of liquid into the turbine. This event would severely damage the turbine blades. Under normal operating conditions this event is highly unlikely due to the large input of heat by the combustion chamber which would change any liquid to vapor before it entered the turbine.

In the case of shutdown, however, the safeguard provided by heat from the combustion chamber is reversed. The compressor, still operating under its inertia as the engine coasts to a halt, is forcing air through the combustion chamber. But, since the shut off signal has been given, and fuel flow to the combustion chamber has been shut off, the compressed air flow acts to cool the combustion chamber. In turn, this large volume of cooling air condenses any steam in the steam line and superheater sections between the water storage drum and the gas turbine. This condensate could then fill the boiler tubes, combustion chamber and possibly the gas turbine itself with liquid.

The improvement in shutdown procedure which is the subject of this invention concerns the maintenance of fuel flow to the combustion chamber after the shutdown command has been given and the steam injector valve has been closed. In this manner, the combustion chamber remains a heat source for a short interval after the shutdown signal is given to prevent any inopportune condensation of injected steam, thus protecting the system from damage.

It is therefore an object of this invention to provide a procedure for shutting down a Cheng cycle system which is easy and requires no additional equipment;

It is a further object of this aspect of the invention to provide a shutdown procedure which will prevent damage to the superheater section, combustion chamber and gas turbine.

SUMMARY OF THE INVENTION

A shutdown procedure is described which minimizes the potential for damage caused by the condensation of steam in the superheater section, the combustion chamber and the gas turbine. When the shutdown command is given, fuel flow is provided to the combustion chamber for a short time after the steam injector valve is closed. This assures that the temperature of the residual injected steam remains above its condensation point until after it has passed through the combustion chamber and gas turbine.

DESCRIPTION OF THE PREFERRED EMBODIMENTS

Figure 1:
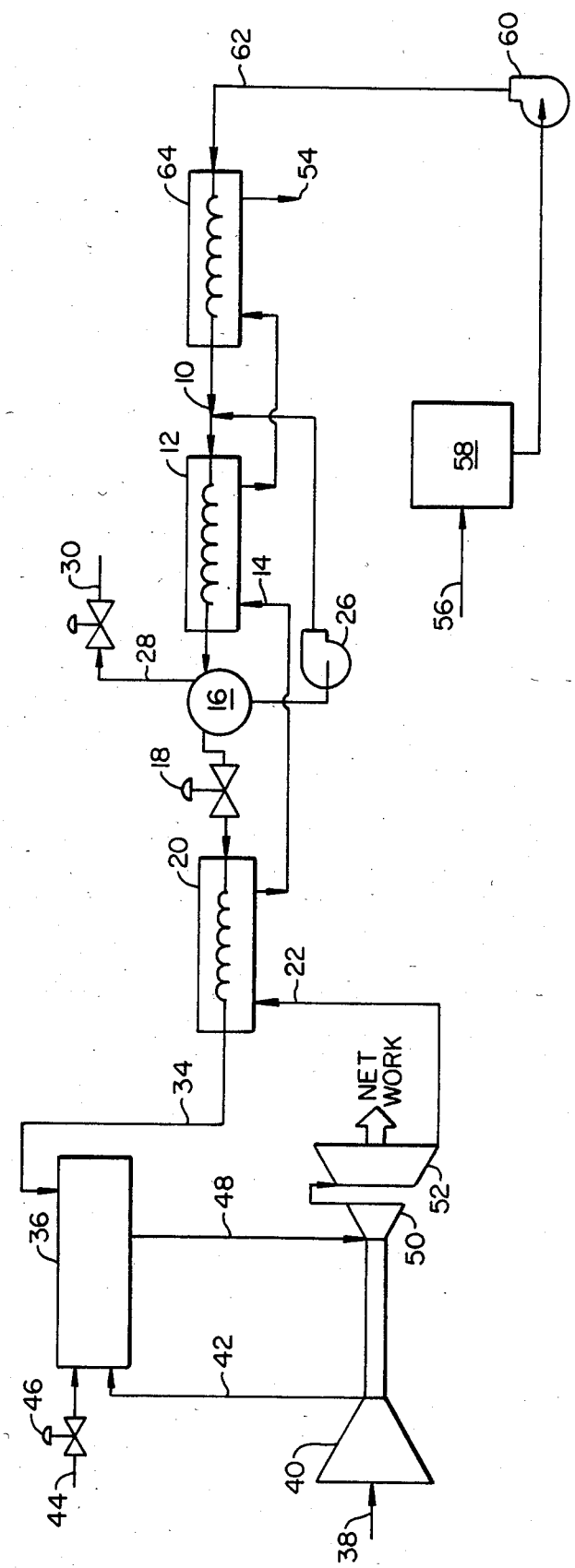
FIG. 1 is a block diagram of one embodiment of the Cheng cycle system.

Referring to FIG. 1, a major problem with the previously used shutdown procedure was the potential for the condensation of steam in between the steam injector control valve 18 and the turbine exhaust line 48. When the shutdown command is given, the steam injector control valve 18 closes but steam is nevertheless trapped between this point and the turbine exhaust line 22. The hydrocarbon fuel source control means 46 terminates the flow of fuel to the combustion chamber 36 once the shutdown signal is given, but the air compressor 40 continues to provide compressed air to the combustion chamber 36 due to the inertia of the engine. This compressed air is not being heated as it would be under normal operating conditions in the combustion chamber 36 because the fuel has been shut off. This incoming compressed air can cool the steam entering the combustion chamber 36 through the steam injection line 34 below its condensation temperature, causing liquid to form in the steam injection line 34 and the combustion chamber 36. An even more serious problem is encountered if the steam condenses in the combustor exhaust line 48. The presence of liquid here could result in damage to the core turbine 50 and the working turbine 52.

The solution to this problem is the subject of this invention, involving an improved shutdown procedure. When the shutdown signal is given, the steam injector control valve 18 is closed. The improved procedure eliminates the condensation problem in the following way. Instead of the fuel source control means 46 cutting off fuel flow to the combustion chamber 36 at the same time as when the steam injector control valve 18 is closed, the fuel flow to the combustion chamber 36 is maintained for a short interval while the steam injector control valve is closed. This maintains a high temperature in the combustion chamber 36. This additional heat enables the steam remaining in the system between the steam injector control valve 18 and the core turbine inlet 50 to stay above the condensation temperature. The system coasts to a halt, as in the previously used shutdown procedure, once the residual steam has passed through the turbine 52.

Obviously, other modifications and variations of the present invention are possible in light of the above teachings. It is therefore to be understood that changes may be made in the particular embodiments described herein which are within the scope of the appended claims.

We claim:

1. The method of shutdown sequencing of a steam-injected gas turbine engine, said engine comprising:
   (a) a chamber;
   (b) compressor means for introducing air into said chamber;
   (c) means for introducing steam within said chamber, including at least a steam injection line;

(d) means for heating said air and steam in said chamber, including at least fuel flow controls and means for combustion, (e) turbine means responsive to a mixture of air, combustion products and steam for converting the energy associated with the mixture to mechanical energy, said mechanical energy used to power a work load, (f) counterflow heat exchanger means, including at least superheater and evaporator and economizer sections, for transferring residual thermal energy from the mixture of air, combustion products and steam exhausted from said turbine means to incoming steam, and (g) a steam injector control valve, located between, and connected to, said superheater and evaporator sections, said method comprising the steps of:

disengaging said turbine means from its load;

closing said steam injector control valve so as to prevent further flow of steam to said chamber;

continuing to supply fuel and air to said chamber for a short interval after said steam injector control valve has been closed; and stopping the flow of fuel to said heating means within said chamber.

* * * * *